(12) United States Patent
Etzion et al.

(10) Patent No.: US 8,943,009 B2
(45) Date of Patent: Jan. 27, 2015

(54) METHOD OF ADAPTING AN EVENT PROCESSING COMPONENT HAVING A PLURALITY OF EVENT PROCESSING AGENTS WHICH CARRY OUT A PLURALITY OF RULES COMPLYING WITH AT LEAST ONE CORRECTNESS REQUIREMENT TO PROCESS A PLURALITY OF EVENTS

(75) Inventors: Opher Etzion, Haifa (IL); Elior Malul, Haifa (IL); Inna Skarbovsky, Kiryat Ata (IL); Tali Yatzkar-Haham, Missgav (IL)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 13/300,586

(22) Filed: Nov. 20, 2011

(65) Prior Publication Data
US 2013/0132978 A1    May 23, 2013

(51) Int. Cl.
G06F 17/21 (2006.01)
G06F 17/40 (2006.01)
G06N 5/02 (2006.01)
G06F 9/54 (2006.01)
G06Q 30/08 (2012.01)

(52) U.S. Cl.
CPC .............. *G06F 9/542* (2013.01); *G06Q 30/08* (2013.01)
USPC .................. 706/46; 706/47; 706/58

(58) Field of Classification Search
CPC ........... G06N 5/02; G06N 5/04; G06Q 30/02; A63F 13/12
USPC ............................................. 706/46
See application file for complete search history.

(56) References Cited

U.S. PATENT DOCUMENTS

| | | | |
|---|---|---|---|
| 7,689,994 | B2 | 3/2010 | Vronay et al. |
| 2009/0125550 | A1 | 5/2009 | Barga et al. |
| 2009/0125635 | A1 | 5/2009 | Barga et al. |

OTHER PUBLICATIONS

Vincent et al., Semantic Complex Event Processing [online], 2010 [retrieved on Mar. 7, 2014]. Retrieved from the Internet:<URL:http://www.tibco.com/blog/wp-content/uploads/2010/07/semtech2010-semantic-cep-v8.pdf>.*

Jun Sun et al., "Specifying and Verifying Event-based Fairness Enhanced Systems", Proceedings of the 10th International Conference on Formal Engineering Methods (ICFEM 2008), Oct. 2008, pp. 318-337.

* cited by examiner

*Primary Examiner* — Jeffrey A. Gaffin
*Assistant Examiner* — Nathan Brown, Jr.

(57) ABSTRACT

A method of adapting an event processing component. The method comprises designating an event processing component having a plurality of event processing agents which carry out a plurality of rules to process a plurality of events, selecting at least one rules correctness requirement, and automatically adjusting, using a processor, the plurality of event processing rules to comply with the at least one correctness requirement.

19 Claims, 5 Drawing Sheets

```
===Input Bids===
Bid Start 12:55:00
credit bid id=2,occurrence time=12:55:32,price=4
cash bid id=29,occurrence time=12:55:33,price=4
cash bid id=33,occurrence time=12:55:34,price=3
credit bid id=66,occurrence time=12:55:36,price=4
cash bid id=56,occurrence time=12:55:59,price=5
Bid End 12:56:00

===Winning Bid===
cash bid id=29,occurrence time=12:55:33,price=4
```

METHOD OF ADAPTING AN EVENT PROCESSING COMPONENT HAVING A PLURALITY OF EVENT PROCESSING AGENTS WHICH CARRY OUT A PLURALITY OF RULES COMPLYING WITH AT LEAST ONE CORRECTNESS REQUIREMENT TO PROCESS A PLURALITY OF EVENTS

BACKGROUND

The present invention, in some embodiments thereof, relates to event processing and, more specifically, but not exclusively, to events and derived events in event processing systems and/or applications.

During the last years, event processing has become a common infrastructure for real-time applications which require processing of data streams, such as electronic trading systems, and network monitoring. Event processing systems are capable of detecting complex situations (a context-sensitive composition of messages and events), rather than single events. The functionality is applicable when processing a composition of event sources from a business, application, or infrastructure perspective within different contexts. Sample scenarios relating to SLA alerts and compliance checking are applicable to retail and banking Experience shows that there are utilization barriers in the development of event processing systems within the current state of the practice technology. One of these utilization barriers is the fact that in many cases it is difficult to create applications that are consistent with the requirements and intuition of the users, especially as it relates to the notion of time; on one hand, processing is done within the physical time of the system, on the other hand, events may come with their own logical occurrence time. This problem becomes even more acute when dealing with the processing of derived events (events that are derived by event processing agents (EPA) within the event processing system). This phenomenon either leads to incorrect outcomes in some cases, or leads to hacking work around these issues for a particular event processing system or application.

SUMMARY

According to some embodiments of the present invention, there is provided a computerized method of adapting an event processing component. The method comprises designating an event processing component having a plurality of event processing agents carrying out a plurality of event processing rules to process a plurality of events, selecting at least one rules correctness requirement, and automatically adjusting, using a processor, the plurality of event processing rules to comply with the at least one correctness requirement.

According to some embodiments of the present invention, there is provided a system of adapting an event processing component. The system comprises a processor, an input interface which designates an event processing component having a plurality of event processing agents carrying out a plurality of event processing rules to process a plurality of events, a rules correctness requirement module which sets at least one rules correctness requirement, and a mapping module which automatically adjusts, using the processor, the plurality of event processing rules to comply with the at least one correctness requirement.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figures 1A, 1B:
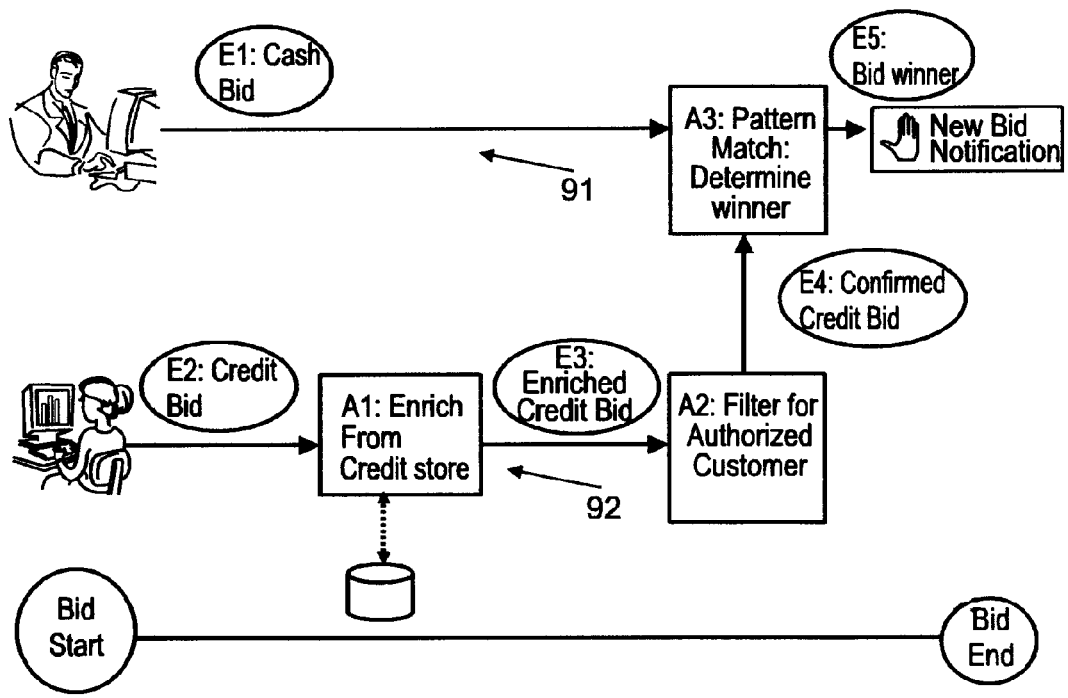
FIG. 1A is a schematic illustration of events which are processed in an auction management system by a number of event processing agents.
FIG. 1B is a table that includes listing of input events and results obtained by using an event processing system.

The present invention, in some embodiments thereof, relates to event processing and, more specifically, but not exclusively, to events and derived events in event processing systems and/or applications.

According to some embodiments of the present invention, there are provided methods and systems for increasing the correlation between the design of an event processing component and the behaviour thereof in run time by adjusting, according to one or more rules correctness requirements, event processing rules which are carried out by event processing agents (EPAs) of the event processing component.

The rule adjustment is optionally made by mapping one or more rules correctness requirements to a plurality of low level programming language constructs which are added to the event processing component. The mapping is optionally done using event processing language extensions. Optionally, the event processing language extensions are designed to adjust occurrence time of an event occurring in run time and/or define a relation between event(s) occurring in run time and a time frame of said run time.

Optionally, the one or more rules correctness requirements assure that event processing rules are carried out so that events are processed in a logical order, regardless to event processing network (EPN) paths of the event processing component. Additionally or alternately, the one or more rules correctness requirements are mapped to adjust rules carried out by EPAs so that derived events occurring in run time are processed within a common temporal context as respective deriver events. Additionally or alternately, the temporal context boundaries can be closed (include events that occur in the boundary time) or open (does not include events that occur in the boundary time). Additionally or alternately, the one or more rules correctness requirements adjust rules so that certain relations among derived events are maintained in run time.

Optionally, one or more derived events ordering module(s) are added to regulate the order of processing derived events during the run time of the event processing component. These derived events ordering module(s) are optionally carried out by a process that is adapted to the rule correctness requirement(s). Optionally, the derived events ordering module(s) order derived events based on a plurality of maximum delays which are calculated using a weighted directed acyclic graph that is built according to the topology of a plurality of event processing agents of the event processing component. Optionally, the derived events ordering module(s) order derived events using buffers, for example as described below.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an event processing component oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be carried out by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer carried out process such that the instructions which execute on the computer or other programmable apparatus provide processes for implementing the functions/acts specified in the flowchart and/or block diagram block or blocks.

One of the utilization barriers in the development of an event processing system and/or process is the difficultly to create applications that are consistent with requirements and intention of users, especially as it relates to the notion of time. In these systems, processing is performed within the physical time of the system while events occur in a logical occurrence time. These timing differences become even more acute when dealing with the processing of derived events, events derived by EPAs within the system and/or process.

Event processing has a highly temporal nature. In order to avoid timing differences, actual temporal event processing patterns have to match the intention of the event processing designer. This requires monitoring a sequence of events and/or trends on the progress of events with time. In these cases the timing in which events logically occurred from the user's point of view has to be coordinated with the event processing to obtain results which are consistent with the users' intention. Moreover, events are often processed within time frames, referred to herein as time windows, of various types (temporal contexts). The inclusion or exclusion of an event from a certain window instance may change the results. However, these results may be non-intuitive to the user as events may be received at a time frame of a certain window and processed at another time frame of another window, after the certain window closes. This may create race conditions between the opening and/or closing of windows and events whereby the output and/or result of the event processing is unexpectedly and critically dependent on the sequence or timing of the events. Such race conditions, also known as race hazards, are usually handled manually by the user who identifies the timing problem and solves it manually.

In order to exemplify some aspects of the complexity of event processing, reference is now made to FIG. 1A, which is a schematic illustration of events, marked with E1-E5, which are processed in an auction management system by a number of EPAs, marked with A1-A3. In this example, a bid on a certain item in an auction management system starts with a bid start event and ends by a bid end event. The auction management system includes a credit granting functionality that provides and/or approves credit to customers. This allows a bidder to rely on credit when placing the bid, depending on an approval process. In such a system there are two types of bid event types: Cash Bid $E_1$ and Credit Bid $E_2$. The Credit Bid is processed by EPA $A_1$ that determines credit status and balance, and then filtered by EPA $A_2$ for credit authorization. This creates a derived event of type enriched Credit Bid $E_3$, which is derived from EPA $A_1$ processing. A Confirmed Credit Bid $E_4$, which is a filtered-in event and an instance which has the same structure of $E_3$. Bidders may issue multiple bids during the time interval in which the bid opens, in both tracks 91, 92, the one counted is the last one that was issued by the bidder. The winner is determined by EPA $A_3$ that gets all the bids from both paths 91, 92 and determines the winner accordingly.

The two rules that determine the winner of the auction are carried out by the EPAs as follows:

all bidders have issued a bid within a validity interval that defines a validity time frame for participating in the bid; and the highest bid wins where in the case of a tie between bids, the first accepted bid wins.

To illustrate the difficulty of implementing these rules in current systems, reference is also made to FIG. 1B, which is a table that includes Listing of results obtained by using an event processing network. As the listing shows, though the winner should be bidder 56, who issued the highest bid (5), the winner is bidder 29 which is second to bidder 2 in bidding (4). This erroneous decision is an outcome of the following:

1. Bidder 2 issued a Credit Bid short time before bidder 29 issued a Cash Bid, since the credit bit had approval path before getting into the determine winner EPA, it appeared to the EPA that it occurred later.
2. Bidder 56 issues its cash bit short time before the bid interval ends, however, an internal race condition resulted in the bid end event occurring before this event was processed, thus it did not get in time to participate in the winner calculation for this auction.

Figure 2:
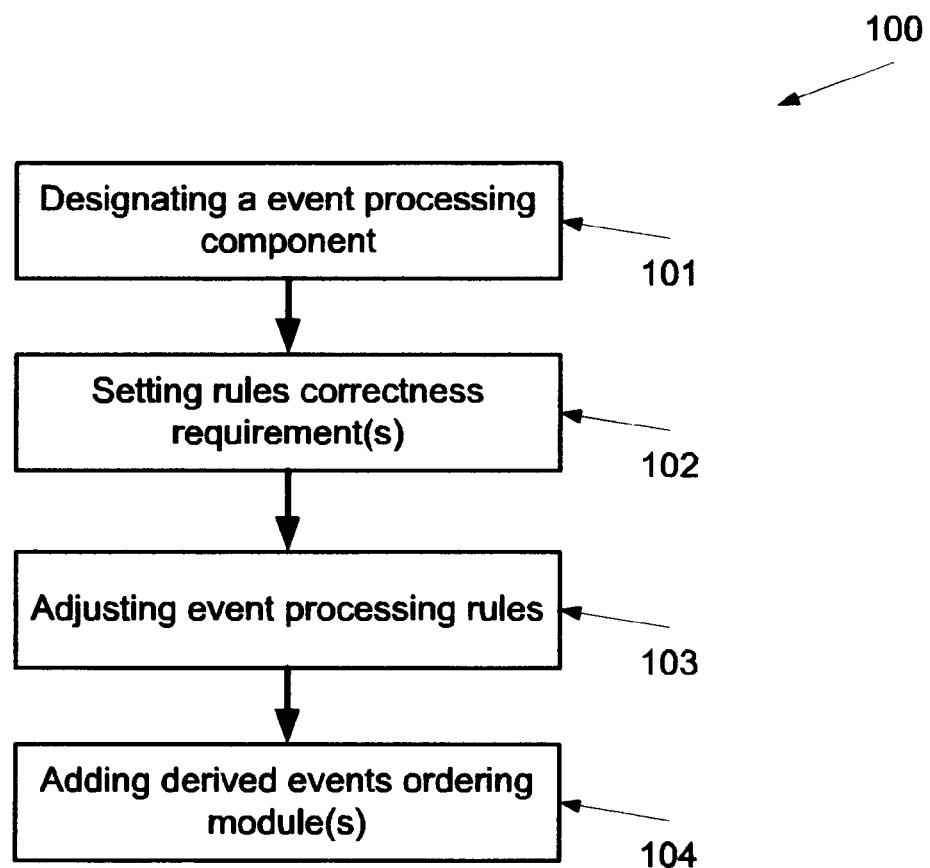
FIG. 2 is a flowchart of a method of adapting an event processing component to comply with a set of rule correctness requirements, according to some embodiments of the present invention.

Reference is now made to FIG. 2, which is a flowchart of a method 100 of adapting an event processing component to comply with rules correctness requirements, according to some embodiments of the present invention. The adaptation is performed by automatically adjusting event processing rules to comply with rules correctness requirement(s), optionally without a need to define manually low level programming language constructs and/or design workarounds. In run time, these adjusted event processing rules are carried out by the EPAs of the event processing component. The automatic adjustment raises the level of abstraction in the design of an event processing component. Optionally, the rules correctness requirements are model independent, and therefore applicable for various event processing implementation types.

The event processing component is intended to refer to a computer-related entity, a hardware or hardware simulation, a combination of hardware simulation and software, software, or software in execution, wherein a plurality of events are processed by one or more EPAs, optionally in an EPN architecture. For example, an event processing component may be, but is not limited to, a process intended to run on a processor, an executable, a thread of execution, and/or a program. By way of illustration, both an application running on a server and the server can be an event processing component. One or more event processing components may reside within a process and/or a thread of execution and an event processing component may be localized on one computer and/or distributed between two or more computers.

The method 100 is carried out, for example executed, by a computing unit or system, such as a local computing unit or system, for example a desktop, a laptop and/or a remote computing unit, for instance in a cloud computing architecture, or a network environment using a client-server configuration.

Figure 3:
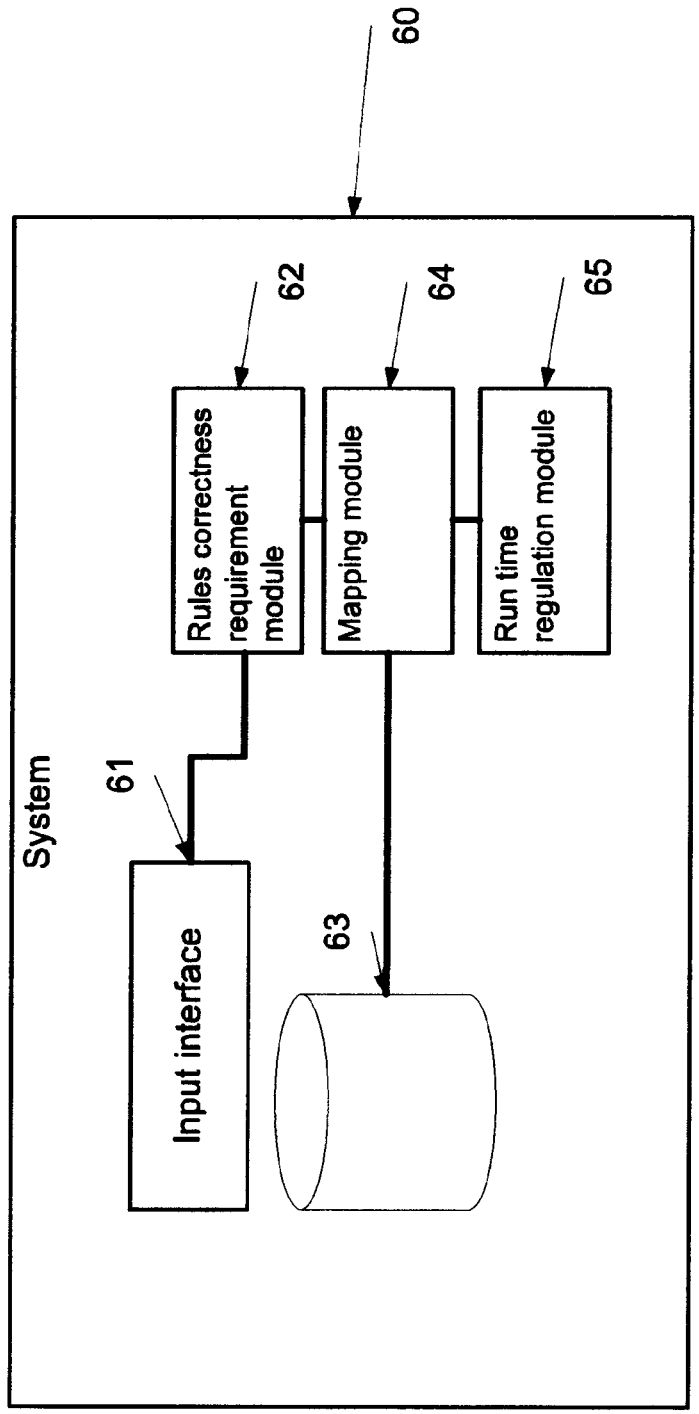
FIG. 3 is a relational view of software components of a system for adapting event processing rules of an event processing component, according to one embodiment of the invention.

Reference is also made to FIG. 3 which illustrates a relational view of software components of a system 60 for adjusting rules carried out by agents of an event processing component, and optionally adding ordering modules for regulating the order of derived events in run time, according to one embodiment of the invention. As shown, software components include an input interface 61, a rules correctness requirement module 62, a repository 63 which stores a plurality of linguistic extensions, a mapping module 64, and an run time regulation module 65. The lines in FIG. 3 depict optional and non limiting data flow between the modules.

First, as shown at 101, the system 60, for example the input interface 61, designates, for example, selects, receives and/or accesses an event processing component that is associated with a plurality of events processed by one or more EPAs according to a set of event processing rules, referred to herein as rules. Optionally, the event processing component is received from a workspace, such as a computing environment, for designing event processing components.

Now, as shown at 102, a set of one or more rules correctness requirements defining guidelines which rules carried out by EPAs has to comply with, for example processing order and/or timing of events guidelines, are set, for example selected from a dataset of rules correctness requirements. These rules correctness requirement(s) may be referred to herein as a correctness scheme. Optionally, the correctness scheme is a general predefined correctness scheme which is selected from a database of predefined correctness schemes by a user for a specific event processing component. Optionally, the general correctness scheme is defined so that rules which comply therewith define a processing order based on actual processing time of the EPAs of the event processing component. As an example, three optional correctness schemes are provided herein:

1. Fairness correctness scheme—including rules correctness requirement(s) to assure that the processing order of event is logical, regardless to the EPN paths in the event processing component. It requires that a derived event e', which is derived from an event e, is considered to have common order relations with other events such as e. For example, for any event e" if e<<e" than e'<<e" where << denotes an order relation so that e<<e' means that e is a predecessor, not necessarily immediate, of e' within an order relation. For instance, in the fair auction scenario that is depicted in FIG. 1A, the fairness correctness scheme may adjust rules carried out by EPAs to assure that if an event of type Credit Bid has been emitted before an event of type Cash Bid, then its derived event of the type Enriched Credit Bid should win in case of a tie for the highest bid. For example:

Bid $B_1$ starts at 9:00 and ends with a Bid End event at 11:00;

an event of type Cash Bid is issued for customer $C_1$ in 10:45:01 with the amount of $15,000;

an event of type Credit Bid is issued for customer $C_2$ in 10:44:57 with the amount of $15,000 and a corresponding event of type Enriched Credit Bid is created in 10:45:03 where a filtering agent $A_2$ approves it and creates a Confirmed Credit Bid event in 10:45:10; and in 11:00 (the bid end) it is determined that $15,000 was the highest bid amount with two bidders: $C_1$ and $C_2$.

In this example, according to the following exemplary fairness correctness scheme, bidder $C_2$ should have been chosen as a winner, although its direct input to the EPA that determines the winner was created later than the event related to $C_1$.

2. A nested derivation correctness scheme—including rules correctness requirement(s) to assure that a derived event is processed with relation to a respective deriver event. For example the nested derivation correctness scheme assures that a derived event occurs within the same temporal context, for instance a window, or has a co-ending temporal context, as a respective deriver event. This nested derivation correctness scheme provides an expected event flow when an event that is derived at the end of the window participates in a derivation of another event that logically happens at the same time. These correctness schemes overcome race conditions which are induced from a window closing process.

Figure 4A:
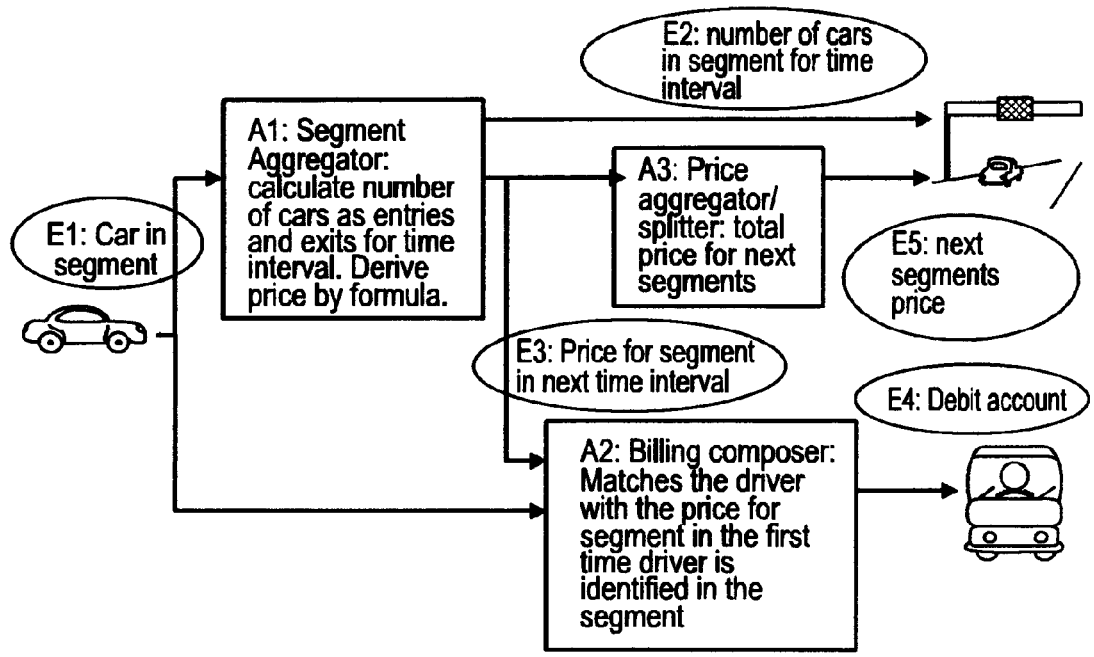
FIG. 4A is a schematic illustration of events, which are processed in an adaptive toll system by a number of event processing agents.

For example, reference is now made to FIG. 4A which is a schematic illustration of events which are processed in an adaptive toll system by a number of event processing agents. In FIG. 4A, event of type Next segments prices (E5) which accumulates the price for all segments in Wj accumulates all events of type Segment Price (E3) which are created within the same time window Wj, for example they calculate the price based on the traffic volume during Wj. Note that since an event of type Segment Price is calculated at the end of Wj, its detection time is most probably later to Wj. For instance, if Wj=(10:00,10:10) and the road has three segments; the three Segment Price events created for this window are created in 10:10:02, 10:10:03 and 10:10:05. These events need still be included in the Price Aggregator (A3) that refers to (10:00, 10:10).

3. A consecutive window correctness scheme—including rules correctness requirement(s) to assure a relation between one or more derived events and one or more sliding windows, for example that a derived event should be processed in a consecutive window to the window of a respective deriver event.

In this assertion, derived events are associated to a consecutive window, for example a consecutive instance of the temporal dimension of a context of type sliding window, where other dimensions of the context remain unchanged. To apply the assertion, an auxiliary function which returns a window W→W, a successor of a given window w of the same domain, is defined. More formally: succ: W→W, where $$succ(w)=w' \leftrightarrow w'>w \wedge (\forall w''.w''>w \rightarrow w'' \geq w')$$

Figure 4B:
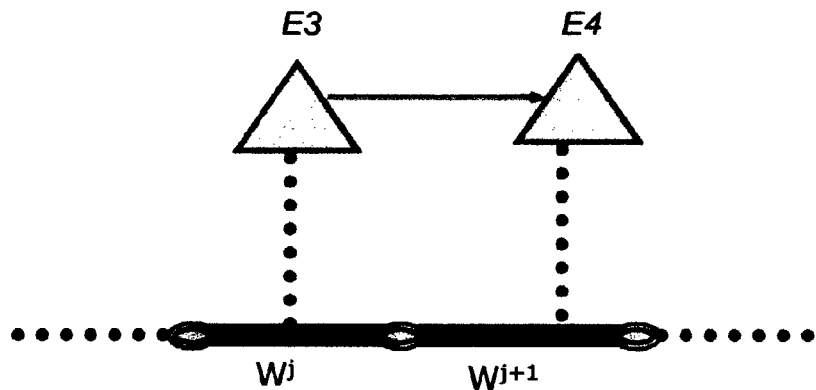
FIG. 4B is a schematic illustration of window-event relationship wherein an event in a certain window is used to derive another event in a consecutive window.

For example, reference is now made to FIG. 4A and FIG. 4B, which is a schematic illustration of window-event relationship wherein an event of type Segment Price (E3) that refers to $W_j$ is used to derive Debit account (E4) within $W_j+1$. In this example $W_j$=(10:00, 10:10) and $W_j+1$=(10:10, 10:20). An event of type Segment Price created for a segment Si at (10:00, 10:10) calculates the price as 5$ for the segment. A vehicle v arrives at 10:13, the car arrival event Car entered segment is composed with the event Segment Price that refers to the previous window. As a corollary of these requirements, an event of type Segment Price that is associated with segment Si and window $W_j$ should be processed within the window $W_j$ in the Price Aggregator to derive the right instance of the Next segments prices event, while the same event should be processed within the window $W_j+1$ by the Billing Composer EPA to derive the right instance of Debit account. Let $W_j$=(10:00, 10:10) and Wj+1=(10:10, 10:20), and e be an instance of Segment Price (E3) that references (10:00, 10:10) and is derived at 10:00:04, e is processed by the Price Aggregator (A3) in the context of time window (10:00, 10:10) and in the Billing Composer (A2) in the context of time window (10:10, 10:20).

Figure 5:
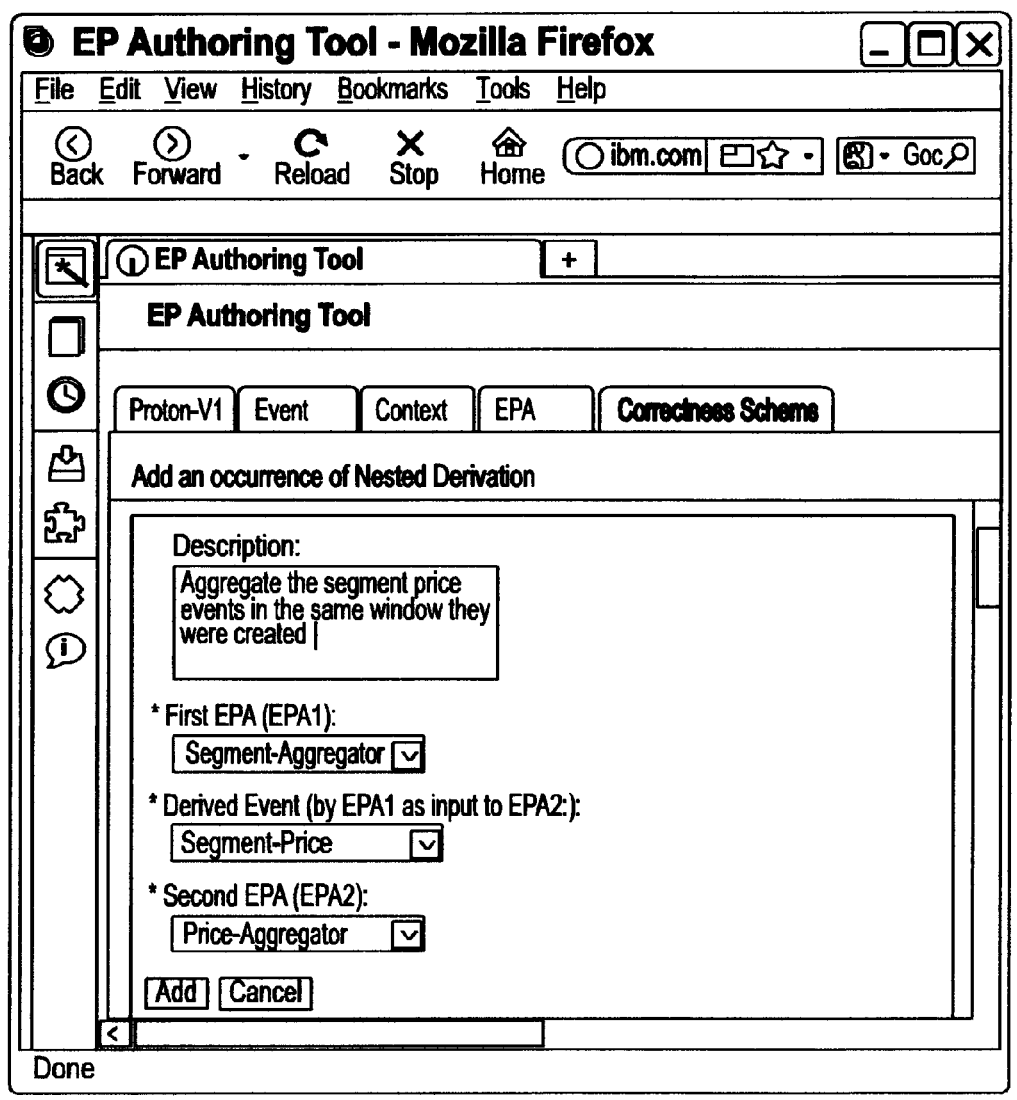
FIG. 5 is a schematic illustration of an exemplary graphic user interface for defining a nested derivation correctness scheme, according to one embodiment of the invention.

Each one of the correctness schemes may be represented by a parametric template that contains a correctness scheme type and parameters, for example as defined above. The parametric template is optionally independent of any particular event processing model or implementation. Optionally, a designer uses a correctness scheme template adapted for the correctness scheme she selects. Optionally, the designer selects a correctness scheme out of defined correctness schemes and optionally set its inputs, for example as seen in FIG. 5 which is a schematic illustration of an exemplary graphic user interface (GUI) that is defined for a nested derivation correctness scheme.

Reference is now made, once again, to FIG. 2. Now, as shown at 103, one or more of the event processing rules which are carried out by the EPAs of the event processing component are automatically adjusted to comply with the one or more rules correctness requirements, which may be general correctness schemes. In order to facilitate the automatic adjustment, a plurality of extensions to the event processing execution language used in the event processing component may be provided. For example, a set of event processing language extensions may be stored in the repository 63. The event processing language extensions are optionally additions to the event processing language which define the event processing rules which are carried out by the EPAs of the event processing component.

The event processing language extensions allow policy-based assignment of occurrence time value for derived events and/or policy-based semantics of edge points of a time frame, such as a window, and adjusting the event processing rules so that they are in compliance with the selected correctness scheme.

Reference is now made to exemplary processing language extensions which may be used to adjust rules to comply with the correctness schemes by policy-based assignment of occurrence time value for derived events. In these language extensions, an occurrence time of an event is defined as the time in which the event has occurred.

Optionally, a plurality of linguistic extensions that enable specifying how to derive a value of occurrence time of a derived event according to various policies are defined. While various policies may be defined, three are provided herein to support common cases:

1. Detection time linguistic extension: event processing language extensions that set the occurrence time of an event to be equal to its detection time, for example the time that the EPA outputs a derived event.
2. Deriver's occurrence time linguistic extension: event processing language extensions that set the occurrence time to be equal to the occurrence time of the last event that caused the detection of a derived event.
3. End of window: event processing language extensions that set the occurrence time to be the end time of a temporal dimension of the context in which the derived event was detected, for example the closing of a window.

Reference is now made to exemplary event processing language extensions, which are assigned for adjusting policy-based semantics of edge points of temporal frames. These linguistic extensions enable defining whether each edge of a temporal frame is an open edge or a closed edge. That is, whether the temporal frame may include events whose occurrence time equals to the window start time or end time. For brevity, W denotes a time window whose start and end timestamps are $T_s$ and $T_e$.

The following exemplary table shows the different inclusion options of an event with variable edge properties, denoted herein as e, whose occurrence time is denoted by $\tau$, by W:

| Window start | window end | Inclusion condition: |
|---|---|---|
| open | open | $T_s < \tau < T_e$ |
| open | closed | $T_s < \tau \leq T_e$ |
| Closed | open | $T_s \leq \tau < T_e$ |
| Closed | closed | $T_s \leq \tau \leq T_e$ |

The type of edge points, which are used by temporal frames, substantially affect scenarios in which the same timestamp is used to open and/or close more than one temporal frames, for example every short period.

Optionally, the event processing language extensions are assigned for both policy-based assignment of occurrence time value for derived events and policy-based semantics of edge points of a time frame. For example, an occurrence of bid end events which occur every ten minutes are defined with a certain edge point and works under a policy in which derived events occurrence time equals to the occurrence time of the event that cause their detection.

The event processing extensions may be used by the system 60, for example the mapping module 64 to map automatically the correctness scheme to a plurality of low level programming language constructs which are used to adjust the rules carried out by the EPAs. Each low level programming language construct is defined by one or more of the event processing language extensions. The mapping allows automatic translation of high level language user defined correctness scheme(s) to low level programming language constructs which are augmented into the event processing component. As further described below, these low level programming language constructs assures the compliance of the event processing component with the correctness scheme during the execution time thereof.

For example, reference is now made to an automatic translation of the three exemplary correctness schemes to low level programming language constructs.

1. A fairness correctness scheme mapping—fairness correctness scheme ($\pi$, $\psi$) is mapped by the following algorithm where $\pi$ and $\psi$ denotes paths in a graph given as start and end nodes in EPN of the event processing component:

For derived event E' in the $\pi$ $\psi$, the occurrence time order policy (E'):=Deriver's occurrence time.

For example, reference is made to the example for the fairness correctness scheme given above to demonstrate the applying of the fairness correctness scheme between two paths in a graph, which starts with Cash Bid ($E_1$) events and Credit Bid ($E_2$) events respectively. Similarly to the depicted in FIG. 1A. When $A_1$ assigns the Enriched Credit Bid ($E_3$) event occurrence time to be equal to the Credit Bid occurrence time, and $A_2$ assigns Confirmed Credit Bid ($E_4$) occurrence time to be equal to Enriched Credit Bid ($E_3$) occurrence time. In this example, when $A_3$ determines a winner based on a comparison between the occurrence time of the Cash Bid and the Enriched Credit Bid events, it actually compares between the occurrence time of the Cash Bid and the occurrence time of the Credit Bid that induced the Enriched Credit Bid, and hence, it satisfies the fairness correctness scheme.

2. A nested derivation correctness scheme mapping—nested derivation Correctness scheme ($A_1$, $A_2$, E') is mapped by the following algorithm:

Occurrence time order policy (E'):=End of window;
Window start policy (temporal dimension context ($A_2$)):=open; and
Window end policy (temporal dimension context ($A_2$)):=closed.

Consider the example given above for the nested derivation correctness scheme, with respect to FIG. 4A, where the event of type Next segments prices accumulates the price for all segments in $W_j$ should accumulate all events of type Segment Price, which are created within the same time window $W_j$. This is achieved by setting the occurrence time of Segment Price to be equal to $W_j$ termination time and by setting time window $W_j$ of the Price Aggregator to have open start and closed end times. This way all the Segment Price events are processed within $W_j$, allowing correct result according to the correctness scheme.

3. A consecutive correctness scheme mapping—consecutive correctness scheme ($A_1$, $A_2$, E') is mapped by the following algorithm:

Window start policy (temporal dimension context ($A_2$)):=closed; and
Window end policy (temporal dimension context ($A_2$)):=open;

where derived event E' having an occurrence time equals the window end time, is not processed in the same window but in a consecutive one.

For example, the consecutive correctness scheme mapping solves the example given for this correctness scheme above where an event of type Segment Price that refers to $W_j$ is used to derive the Debit account within $W_{j+1}$. By setting window W of Billing Composer to have an open start and closed end, an event Segment Price created at the end of the window would be processed by the Billing Composer in the consecutive window.

After dealing with the build-time issues, showing that the correctness schemes can be defined in high level and mapped to low level programming language constructs, we turn into the run-time issues and discuss in the next section the way that these requirements are manifested in run-time, within our specific system.

Now, as shown at 104, the system 60, for example the run time regulation module 65, optionally adds one or more derived event ordering module(s) which are set to be executed to regulate the order of derived events in run time of the event processing component. The derived event ordering module(s) provide a run-time support for the event processing language extensions, which are augmented into the event processing component, for example as described above. The run-time support may be used to regulate the order of derived events in run-time according to their policy based assignment of occurrence time, taking into account the policy based semantics of edge points of time frames. For example, two exemplary processes are carried out by one or more derived event ordering module(s) are described herein; one that is based on a buffering technique and the other is based on a variation of a linear two phase commit protocol.

The Buffering Process

The buffering process is adjusted to handle derived events rather than raw events. In this process, each EPA of the event processing component is associated with a buffer. Optionally, the buffer size for each EPA is computed, for example by a compute max delay algorithm.

Then, as a preliminary step, an upper bound denoted herein as an up-t(A) is set on the computation time for each type of EPA and its outgoing channels are computed. This may be done according to statistic measurements on previous runs, computing a bound that is predicted to hold for a given percentage x of computations. Selecting an extremely high value of x reduces the probability that the upper bound is violated and increases latency, as further described below.

Now, a weighted directed acyclic graph (DAG), for brevity denoted herein as G, is built, according to the EPN topology of the event processing component. For the sake of simplicity, we assume that the EPN has no cycles, for example that there is no situation in which EPA A depends on event derived by EPA B, while B depends, either directly or not, on event generated by A. This guarantees that no cycles are present in G. To build G, a node $v_A$ is created for every EPA A, and whenever A derives an event that serves as input to EPA B, a direct edge from $v_A$ to $v_B$ is added, where up-t(A) is assigned to weight($v_A$, $v_B$). Such an edge is added in case the input event is either a participant event or an event that is used to determine the context window boundaries. In addition, a mark may be added to some of the graph's nodes.

For example, node $v_A$ is marked as time assigning node if A sets the occurrence time of some of its derived events according to the second or third policy described above. That is, A generates a derived event with occurrence time that is different from its detection time. As a next step, every edge from $v_A$ to $v_B$ in the graph, where $v_A$ is not a time assigning node, is deleted from the graph. After graph G is built, for each $v_A$, maxDelay($v_A$) is computed. maxDelay($v_A$) is the longest weighted path from any node $v_C$ to $v_A$. This is computed using the DAG longest path algorithm, also referred to as compute max delay(EPN):

```
For every agent A in the EPN
    Compute up-t(A) //Build a direct acyclic graph G according to the
    EPN topology
For every edge e=(v_A, v_B) in G
    weight(e): = up-t(A)
For every node v_A in G
    If (A sets occurrence time → e (policy 2 or 3 above))
        time assigning node → v_A
For every edge e=(v_A, v_B) in G
    If (v_A is not time assigning node)
delete e
For every node v_A in G
    Compute maxDelay(v_A)
```

The Compute max delay algorithm is activated offline once in the initialization time and online whenever the EPN structure is updated. At run time, every EPA A has a priority entry buffer $b_A$, for incoming events. Whenever A gets event e, e is placed in $b_A$ according to the following Insert event algorithm, also referred to as Insert event(Agent A, Event e):

```
Put e in priority entry buffer, b_A, according to occurrence-time(e)
    If exists f in b_A: occurrenceTime(e)=occurrenceTime(f)
        If (f is a window start event of context A)
            If (window start policy (A)=close)
                Put e after f
            Else put e before f
        Else if (f is a window end event of context A)
            If (window end policy (A)=close)
                Put e before f
            Else put e after f
```

Any event that A needs to process, such as a participant, a window start event or a window end event is inserted to this buffer. The buffer $b_A$ is a priority queue, sorted by event's occurrence time, where the oldest event is placed in the queue's head. In case a participant event has the same occurrence time as a window start event or a window end event, the participant event is placed before or after it according to the temporal dimension of A's context. If the context has closed initiation type, the participant event is placed after the window start event, so that the EPA first processes the window start event and then the participant event. This way the participant event is processed within the window. If the initiation type is open, the participant event is placed before the window start event. This way the participant event would not be classified to the not-yet-opened window. A similar way is used to synchronize a participant and window end events.

For each EPA A, maxDelay($v_A$) holds the timeout that A needs to wait before it can correctly process incoming events. A removes an event e from the queue head only when:

$$\text{NOW}-\text{occurrence-time}(e) \geq \text{maxDelay}(v_A)$$

In such a manner, it is guaranteed that as long as the timeouts given for the EPAs computation time are not violated, the events are processed in each EPA in the correct order according to their occurrence time, since the buffer size of each EPAs equals to the longest delay in a path where all its EPAs set occurrence time according to the second or third policy.

Variation on the Linear Commit Process with Two Phases

This process is a variation of a linear two phase commit algorithm. In this process, whenever an EPA A needs to process an event e, it is required to guarantee that there is no other event e' with earlier or equal occurrence time that needs to be processed prior to the processing of e. The EPA A guarantees that by initiating an is-safe algorithm, such as the is-safe algorithm that is defined below, and does not process e until it gets a "safe" answer. While A waits, it may receive and process other events before e, if their occurrence time is earlier than the occurrence time of e. As a preliminary phase, as in the previous algorithm, EPAs that set some of their derived events' occurrence time according to the second or third policy described above are marked as time assigning nodes.

If an EPA A can process every incoming event only after it processed all the events with earlier occurrence time, then A should activate the process for each incoming event it processes. Otherwise, if the EPA can compensate on processing participant events out-of-order according to their occurrence time, then A should activate the process in the following cases:

1. When A needs to close a temporal window w, since there may be earlier event e with occurrence time which entitles e to be included in w.

2. When an event e arrives before its context start event. Thus, the processing of e may need to be held back until its context start event (with earlier occurrence time) arrives.
3. When A needs to generate a derived event in an immediate mode, since there may be a window end event, that should have closed the current temporal window before the generation, or there may be participant event with earlier occurrence time that would change the derived event.

The process guarantees that if EPA A activates is-safe for time t, then when it gets a Safe answer, all its relevant input events with occurrence time t or with earlier occurrence times already arrived to A. The events which wait to be processed by A are put in a priority queue according to their occurrence time, and as in the previous algorithm, when there are two events with the same occurrence time they are placed in the queue according to the context boundaries types. The "is safe" algorithm is optionally executed by an independent element that is added to the event processing component. The is-safe algorithm is optionally as follows:

---
is-safe algorithm
---
Initialization: for every EPA A , latest_$t^A$ := −∞
A checks if it is safe to process event e, with occurrence time t on EPN with no cycles is-safe (A , t) {
   if (latest_$t^A$ ≥ t)
    return Safe
   for every EPA B that is direct predecessor of A in the EPN and B is a time assigning node, ask B to activate is-safe(B, t) and wait till all return a Safe answer
   while ((A has in its incoming/outgoing queues, event with occurrence time ≤ t) or (A is busy processing event with occurrence-time ≤ t))
    wait latest_$t^A$ := t
   return Safe
---

The methods as described above are used in the fabrication of integrated circuit chips. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be carried out by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a workspace, a processor, and/or a network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of adapting an event processing component, comprising:
   designating an event processing component having a plurality of event processing agents carrying out a plurality of event processing rules to process a plurality of events;
   selecting at least one rules correctness requirement;
   automatically adjusting, using a processor, said plurality of event processing rules to comply with said at least one correctness requirement; and
   adding at least one derived events ordering module to said event processing component to regulate a plurality of derived events during run time of said event processing component;
   wherein said adding comprises:
   adding a plurality of buffers each to another of plurality of event processing agents:
   wherein said adding comprises:
   computing said plurality of buffers; and
   setting an upper bound to each said buffer.

2. The computerized method of claim 1, wherein said adjusting comprises mapping said at least one correctness requirement to a plurality of low level programming language constructs which are automatically added to said event processing component.

3. The method of claim 2, wherein said adjusting comprises selecting at least one of a plurality of extensions to an event processing language and using said at least one extension to define said plurality of low level programming language constructs.

4. The method of claim 3, wherein at least some of said plurality of extensions set occurrence time of an event occurring in run time.

5. The method of claim 3, wherein at least some of said plurality of extensions define a relation between an event occurring in run time and a time frame during said run time.

6. The method of claim 1, wherein said designating comprises receiving said event processing component from a workspace.

7. The method of claim 1, wherein said selecting is performed by a user which selects said at least one rules correctness requirement from a plurality of general predefined rules correctness requirements.

8. The method of claim 1, wherein said at least one correctness requirement logically defines an event processing order, regardless to event processing network paths in said event processing component.

9. The method of claim 1, wherein said at least one correctness requirement defines that a derived event occurring in run time of said event processing component is processed by at least one of said plurality of event processing agents within a common temporal context as a respective deriver event.

10. The method of claim 1, wherein said at least one correctness requirement defines an execution of one or more derived events occurring in run time of said event processing component according to a relation therebetween.

11. A computer readable medium comprising computer executable instructions adapted to perform the method of claim 1.

12. A computerized method of adapting an event processing component, comprising:
    designating an event processing component having a plurality of event processing agents carrying out a plurality of event processing rules to process a plurality of events;
    selecting at least one rules correctness requirement;
    automatically adjusting, using a processor, said plurality of event processing rules to comply with said at least one correctness requirement; and
    adding at least one derived events ordering module to said event processing component to regulate a plurality of derived events during run time of said event processing component;
    wherein said adding comprises:
    building a weighted directed acyclic graph according to the topology of an event processing network of said event processing component; and
    using said weighted directed acyclic graph to compute a plurality of maximum delays among paths connecting between said plurality of event processing agents;
    wherein said plurality of derived events are regulated using said plurality of maximum delays.

13. A computerized method of adapting an event processing component, comprising:
    designating an event processing component having a plurality of event processing agents carrying out a plurality of event processing rules to process a plurality of events;
    selecting at least one rules correctness requirement;
    automatically adjusting, using a processor, said plurality of event processing rules to comply with said at least one correctness requirement; and
    adding at least one derived events ordering module to said event processing component to regulate a plurality of derived events during run time of said event processing component;
    wherein said at least one derived events ordering module is set to regulate said plurality of derived events by verifying that whenever one of said plurality of event processing agents needs to process a certain of said plurality of derived events there is no other event with earlier or equal occurrence time that needs to be processed prior to the processing of said certain derived event.

14. A system of adapting an event processing component, comprising:
    a processor;
    an input interface which designates an event processing component having a plurality of event processing agents carrying out a plurality of event processing rules to process a plurality of events;
    a rules correctness requirement module which sets at least one rules correctness requirement; and
    a mapping module which automatically adjusts, using said processor, said plurality of event processing rules to comply with said at least one correctness requirement; and
    a derived events ordering module adapted to regulate a plurality of derived events during run time of said event processing component, said derived events ordering module is adapted to compute a plurality of buffers each for another of plurality of event processing agents;
wherein each one of said plurality of buffers has an upper bound.

15. The system of claim 14, wherein said mapping module adjusts said plurality of event processing rules by mapping said at least one correctness requirement to a plurality of low level programming language constructs which are added to said event processing component.

16. The system of claim 15, further comprising a repository which stores a plurality of extensions to an event processing execution language of said event processing component, each said low level programming language construct being defined by at least one of said plurality of extensions according to said at least one correctness requirement.

17. The system of claim 15, further comprising an interface which accesses said event processing component to add said plurality of low level programming language constructs thereto.

18. The system of claim 14, further comprising a run time execution module which adds at least one derived events ordering module to said event processing component to regulate a plurality of derived events occurring during run time of said event processing component.

19. A computer program product, comprising a non transitory computer usable medium having a computer readable program code embodied therein, said computer readable program code adapted to be executed to implement a method of adapting an event processing component, said method comprising:
designating an event processing component having a plurality of event processing agents carrying out a plurality of event processing rules to process a plurality of events;
selecting at least one rules correctness requirement;
automatically adjusting, using a processor, said plurality of event processing rules to comply with said at least one correctness requirement; and
adding at least one derived events ordering module to said event processing component to regulate a plurality of derived events during run time of said event processing component;
wherein said adding comprises:
adding a plurality of buffers each to another of plurality of event processing agents:
computing said plurality of buffers; and
setting an upper bound to each said buffer.

* * * * *